(12) United States Patent
Wardlaw et al.

(10) Patent No.: US 9,714,086 B2
(45) Date of Patent: Jul. 25, 2017

(54) FIBER ORIENTATION TO ALLOW FOR AUTOMATED PLY PLACEMENT WITH COMPOSITE ROTOR YOKES

(71) Applicant: Bell Helicopter Textron Inc., Fort Worth, TX (US)

(72) Inventors: Robert Wardlaw, Arlington, TX (US); Werner Idler, Arlington, TX (US); John R. McCullough, Weatherford, TX (US); Patrick Ryan Tisdale, Keller, TX (US); Frank Bradley Stamps, Colleyville, TX (US); James L. Braswell, Jr., Colleyville, TX (US); Ronald J. Measom, Hurst, TX (US); Paul K. Oldroyd, Azle, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 731 days.

(21) Appl. No.: 13/801,666

(22) Filed: Mar. 13, 2013

(65) Prior Publication Data
US 2014/0271209 A1 Sep. 18, 2014

(51) Int. Cl.
*B64C 27/33* (2006.01)
*B32B 37/02* (2006.01)
*F01D 5/02* (2006.01)

(52) U.S. Cl.
CPC ............ *B64C 27/33* (2013.01); *B32B 37/02* (2013.01); *F01D 5/02* (2013.01); *Y10T 156/1062* (2015.01)

(58) Field of Classification Search
CPC ......... B32B 37/02; B64C 27/32; B64C 27/33; B64C 27/35; B64C 27/39; B64C 27/41;
(Continued)

(56) References Cited

U.S. PATENT DOCUMENTS 3,885,887 A * 5/1975 Desjardins .............. B64C 27/45
  416/135
4,293,276 A * 10/1981 Brogdon ................. B64C 27/33
  416/134 A
(Continued)

FOREIGN PATENT DOCUMENTS

WO   2011046543 A1   4/2011
WO   WO 2011046543 A1 *  4/2011   ............. B64C 27/32

OTHER PUBLICATIONS

Hexcel, "HexPly 8552 Epoxy Matrix Product Data".*
(Continued)

*Primary Examiner* — Mark Laurenzi
*Assistant Examiner* — Xiaoting Hu

(57) ABSTRACT

An apparatus comprising a soft in plane rotor yoke comprising two longitudinal side portions connected together via two outboard portions, wherein the outboard portions comprise a plurality of first layers formed of a first composite fabric material having a plurality of first fibers oriented in a first direction, and a plurality of second layers formed of a second composite fabric material having a plurality of second fibers oriented in a second direction. Included is an apparatus comprising a soft in plane rotor comprising two longitudinal side portions connected together via two outboard portions, wherein the outboard portions comprise a plurality of first layers formed of a first composite fabric material, and a plurality of second layers formed of a second composite fabric material, wherein the soft in plane rotor yoke does not comprise any narrow steered slit tape or filament windings.

16 Claims, 5 Drawing Sheets

(58) Field of Classification Search
CPC ....... B64C 27/327; B64C 27/37; B64C 27/48; B64C 2027/4736; B64C 70/207; B64C 11/04; B64C 11/06; B64C 11/12; Y10T 29/49316
USPC .......... 416/230, 244 R, 134 A, 140, 141, 135
See application file for complete search history.

(56) References Cited

U.S. PATENT DOCUMENTS

| | | | |
|---|---|---|---|
| 4,797,064 A | | 1/1989 | Ferris et al. |
| 5,372,479 A | * | 12/1994 | Byrnes .................... B64C 27/33 416/134 A |
| 5,431,538 A | * | 7/1995 | Schmaling .............. B64C 27/33 416/134 A |
| 5,690,474 A | * | 11/1997 | Byrnes .................... B64C 27/82 416/134 A |
| 5,952,067 A | | 9/1999 | Head |
| 6,708,921 B2 | * | 3/2004 | Sims ........................ B64C 27/33 244/17.11 |
| 8,834,128 B2 | * | 9/2014 | Kuntze-Fechner ... B29C 70/545 416/230 |
| 2010/0221119 A1 | | 9/2010 | Baskin |
| 2011/0116936 A1 | * | 5/2011 | Hiros ...................... B64C 27/33 416/244 R |
| 2012/0201683 A1 | * | 8/2012 | Stamps ................... B64C 27/32 416/204 R |

OTHER PUBLICATIONS

Communication from a Counter-Part Application; European Extended Search Report; European Application No. EP 13168630.5; Jul. 25, 2013; 8 pgs.

Communication Pursuan to Article 94(3) EPC issued in European Application No. 13168630.5 on Feb. 17, 2014; 5 pages.

* cited by examiner

FIBER ORIENTATION TO ALLOW FOR AUTOMATED PLY PLACEMENT WITH COMPOSITE ROTOR YOKES

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rotary-wing aircraft employ a variety of means to interconnect a rotating rotor mast to a plurality of rotor blades, one of which is a yoke. Aerospace manufacturers face a multitude of conflicting design constraints when constructing new rotor yoke designs. For example, during flight, rotor yokes must all withstand powerful and repetitive stresses, such as torsional and centrifugal forces. In addition, weight remains a crucial constraint for all rotary-wing aircraft designs due to functional and operation cost concerns. Furthermore, aerospace manufacturers must meet these conflicting design constraints while simultaneously minimizing their costs. Carbon or glass fiber-reinforced composite materials (composite materials) present an attractive alternative for use by aerospace manufacturers to meet these conflicting design constraints.

Composites offer aerospace manufacturers an attractive alternative to metals or other materials due to their relative low cost, lightweight, reduced maintenance requirements, and high strength to weight ratios. The composite material used by aerospace manufacturers may comprise uniformly parallel, continuous fibers embedded in a bonding matrix material that form one or more layers (plies). The fibers provide the composite material with its strength and stiffness, which varies depending upon the fiber material chosen, such as carbon, glass, aramid, and polyethylene. Additionally, the stiffness and strength of the composite ply varies based upon the fibers' direction of loading within the design. The matrix, for example epoxy, phenolic, bismaleimide, and cyanate resins, binds together the fibers that give the composite material its shear strength. Thus, the fiber material, matrix, length, thickness, and cross section profiles of composite rotor yokes can be varied to produce very specific mechanical strength and properties.

Fiber steering is a manufacturing method aerospace manufacturers employ to create rotor yokes that uses unidirectional tape fiber composites. The tape is fed into a tow placement machine that steers the fibers along a curvilinear path through computer control according to a preprogrammed rotor yoke design. Thus, the fiber orientation angle may vary continuously throughout the structure within a given ply. This provides aerospace manufacturers with greater flexibility in achieving desired structural responses by the rotor yoke to the applied stresses experienced during flight.

Rotor yokes manufactured through fiber steering perform exceptionally with respect to the strength to weight ratio, lightweight, and reduced maintenance requirement design constraints. However, the manufacturing costs of such rotor yokes remain relatively high due to the inherent costs of the fiber steering manufacturing process. First, fiber steering manufacturing of rotor yokes requires the purchase of a tow placement machine, which can exceed several million dollars. Furthermore, as the tow placement machine must steer the tape for each path of the design, fiber steering manufacturing is a time intensive process. Additionally, fiber steering manufacturing is a labor intensive process as human operators must interact and monitor during the entire steering process. Also, as one hanging fiber can ruin a completed rotor yoke, the potential for human error adds considerable material waste to fiber steering manufacturing. Therefore, there is a need to develop a lower cost manufacturing method that is capable of maintaining exceptional strength, weight, and reduced maintenance characteristics.

SUMMARY

In one aspect, the disclosure includes an apparatus comprising a soft in plane rotor yoke comprising two longitudinal side portions connected together via two outboard portions, wherein the outboard portions comprise a plurality of first layers formed of a first composite fabric material having a plurality of first fibers oriented in a first direction, and a plurality of second layers formed of a second composite fabric material having a plurality of second fibers oriented in a second direction.

In another aspect, the disclosure includes an apparatus comprising a soft in plane rotor comprising two longitudinal side portions connected together via two outboard portions, wherein the outboard portions comprise a plurality of first layers formed of a first composite fabric material, and a plurality of second layers formed of a second composite fabric material, wherein the soft in plane rotor yoke does not comprise any narrow steered slit tape or filament windings.

In yet another aspect, the disclosure includes a method of constructing a soft in plane rotor yoke for a rotorcraft comprising providing a ply of composite fabric material, wherein the ply of composite fabric material is neither in the form of a narrow steered slit tape nor a filament winding, cutting a plurality of desired shapes from the ply of composite fabric material according to a rotor yoke design, forming a series of overlapping plies from the plurality of desired shapes according to the rotor yoke design, and curing the series of overlapping plies.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
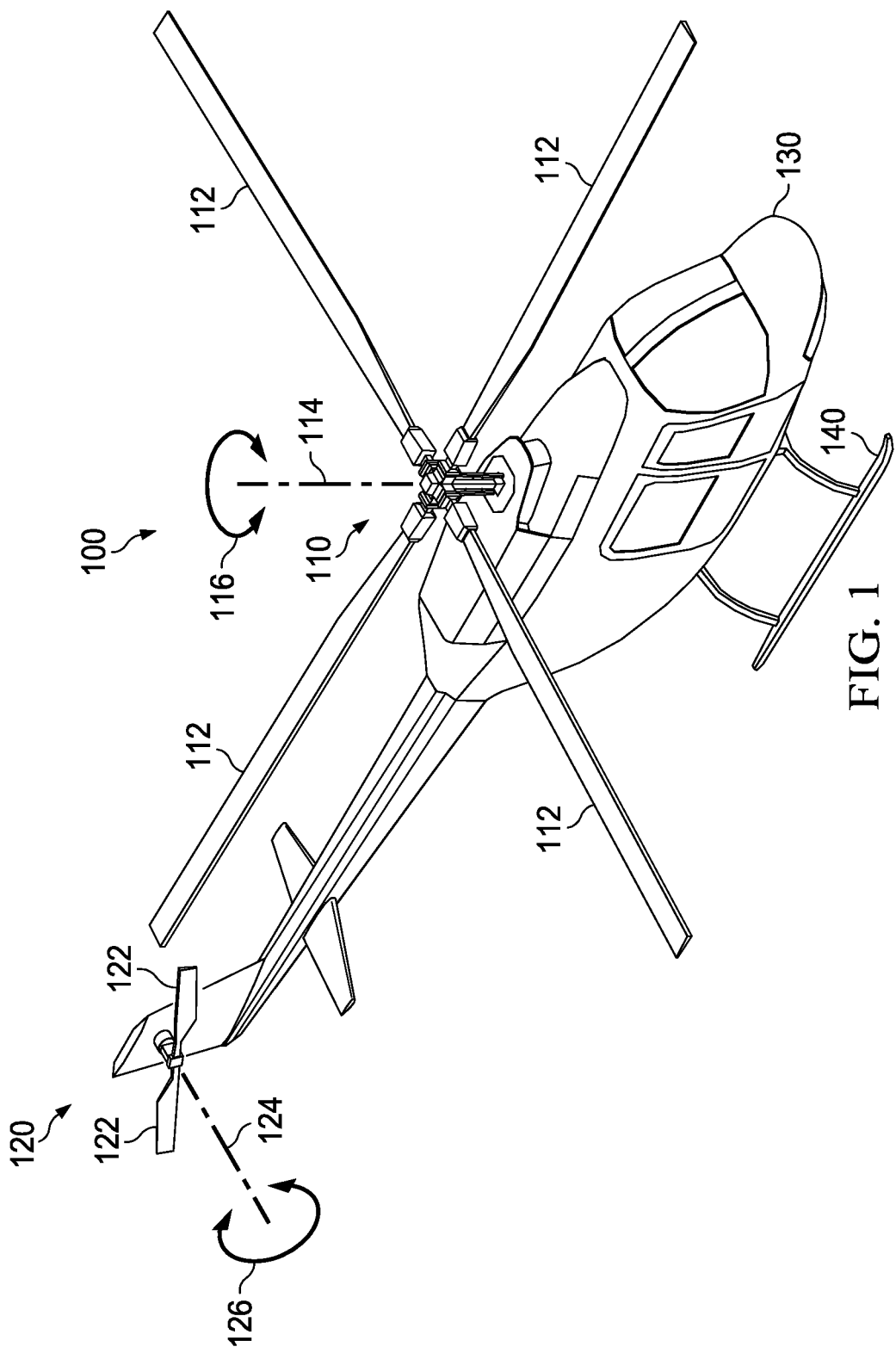
FIG. 1 is a perspective view of a helicopter according to an embodiment of the disclosure.

FIG. 1 is a perspective view of a helicopter 100. Certain embodiments of the disclosure may be used with a helicopter such as helicopter 100. However, it should be understood that the helicopter example is given merely for illustration purposes only. Embodiments of the present disclosure are not limited to any particular setting or application, and embodiments can be used with a bearing in any setting or application such as other aircraft (e.g. airplanes and tilt-rotor aircraft), vehicles, or equipment.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag. Main rotor assembly 110 can also be used to induce pitch and roll of helicopter 100.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the yaw of helicopter 100.

Fuselage 130 is the main body section of helicopter 100. Fuselage 130 optionally holds the crew, passengers, and/or cargo and houses the engine, transmission, gearboxes, drive shafts, control systems, etc. that are needed to establish an operable helicopter. Landing gear 140 is attached to fuselage 130, supports helicopter 100 on the ground, and allows it to take off and land. While the yoke described herein can be used on the main and/or tail rotors of the helicopter 100, it will be appreciated that the yoke described herein can also be used on any other aircraft (tilt rotor, airplane, etc.) or any other type of vehicle.

Figure 2:
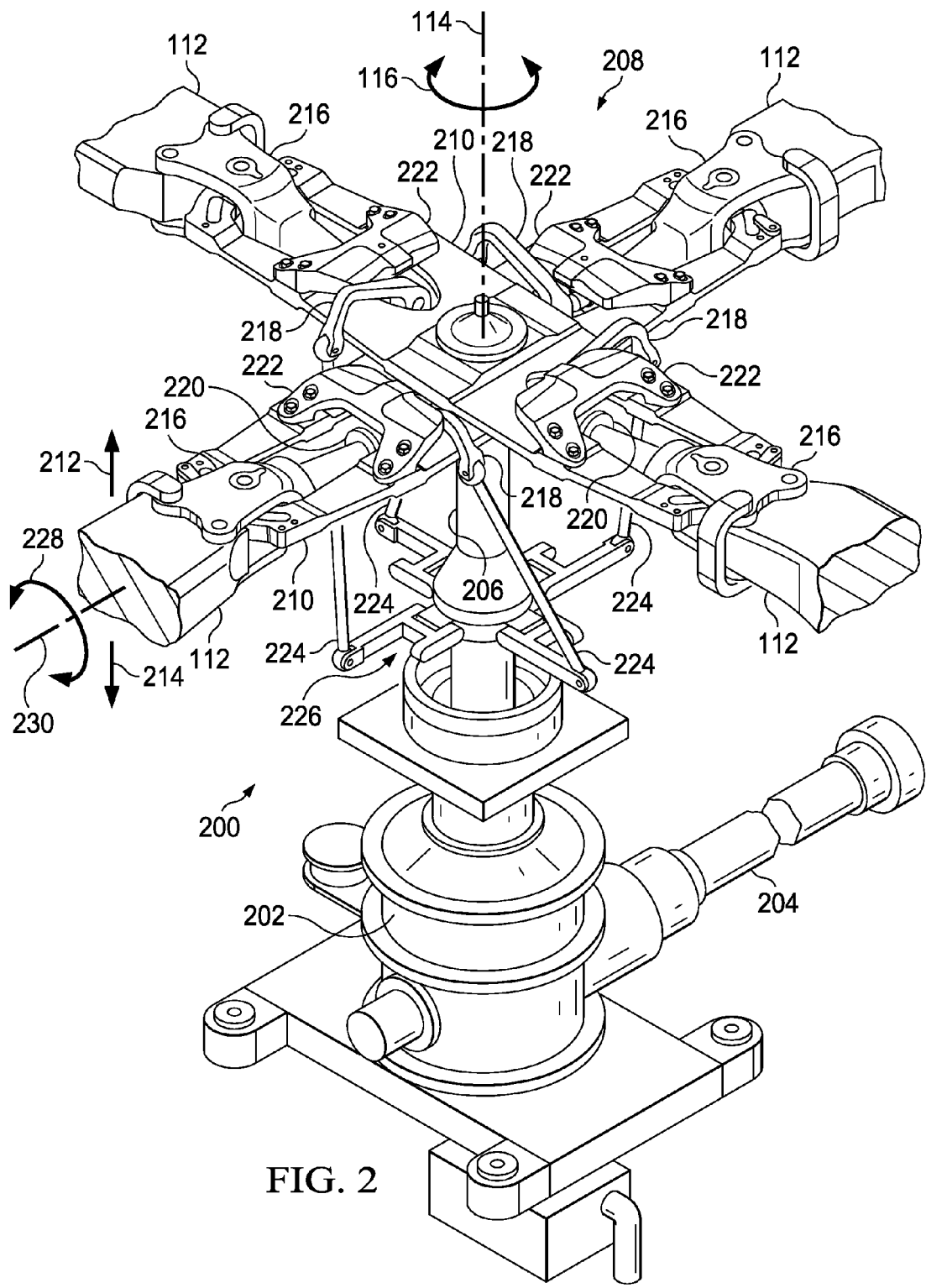
FIG. 2 is a perspective view of a power train according to an embodiment of the disclosure.

FIG. 2 is a perspective view of a power train 200. Power train 200 can be used in a helicopter, such as helicopter 100 shown in FIG. 1. However, power train 200 is not limited to any particular setting. Additionally, it should be noted that the particular example shown in FIG. 2 shows a soft-in plane rotor system having four blades 112. Embodiments of the disclosure are not limited to any particular configuration of rotor system and blades, and embodiments may include any type of rotor system (e.g., fully articulated, rigid, semi-rigid, etc.) and may include any number of blades (e.g., 2, 3, 4, 5, 6, etc.).

Power train 200 includes a transmission 202 that receives power from an engine (not shown) through a driveshaft 204. Transmission 202 drives accessories and controls the rotation 116 of mast 206 about an axis of rotation 114. Mast 206 transfers its rotational movement to blades 112 through a hub 208 that connects mast 206 to blades 112.

Hub 208 optionally includes one or more flexible yokes 210 that enable blades 112 to flap up in the direction indicated by arrow 212 and flap down in the direction indicated by arrow 214. Hub 208 may also include a main rotor grip 216 for each blade 112 that is attached to hub 208. As is described in detail below, main rotor grip 216 includes an outboard end that attaches to a blade 112, an inboard end that attaches to a pitch horn 218, and a spindle between the outboard end and the inboard end. The spindle is supported by a shear bearing 220 that holds the spindle in place and allows it to rotate. Shear bearing 220 is in turn held in place by a bridge plate 222 that attaches shear bearing 220 to yoke 210.

Each pitch horn 218 is connected to a pitch linkage 224. Each pitch linkage 224 is driven up and down (e.g., in the directions shown by arrows 212 and 214) by a swashplate assembly 226. Accordingly, as swashplate assembly 226 moves, it drives pitch linkage 224, which drives pitch horn 218 which rotates main rotor grip 216 about shear bearing 220. This allows the pitch of each of the blades 112 to be controlled. For instance, each blade 112 is able to rotate clockwise or counterclockwise as indicated by arrow 228 about an axis of rotation 230 that runs along the length of each blade 112.

Figure 3:
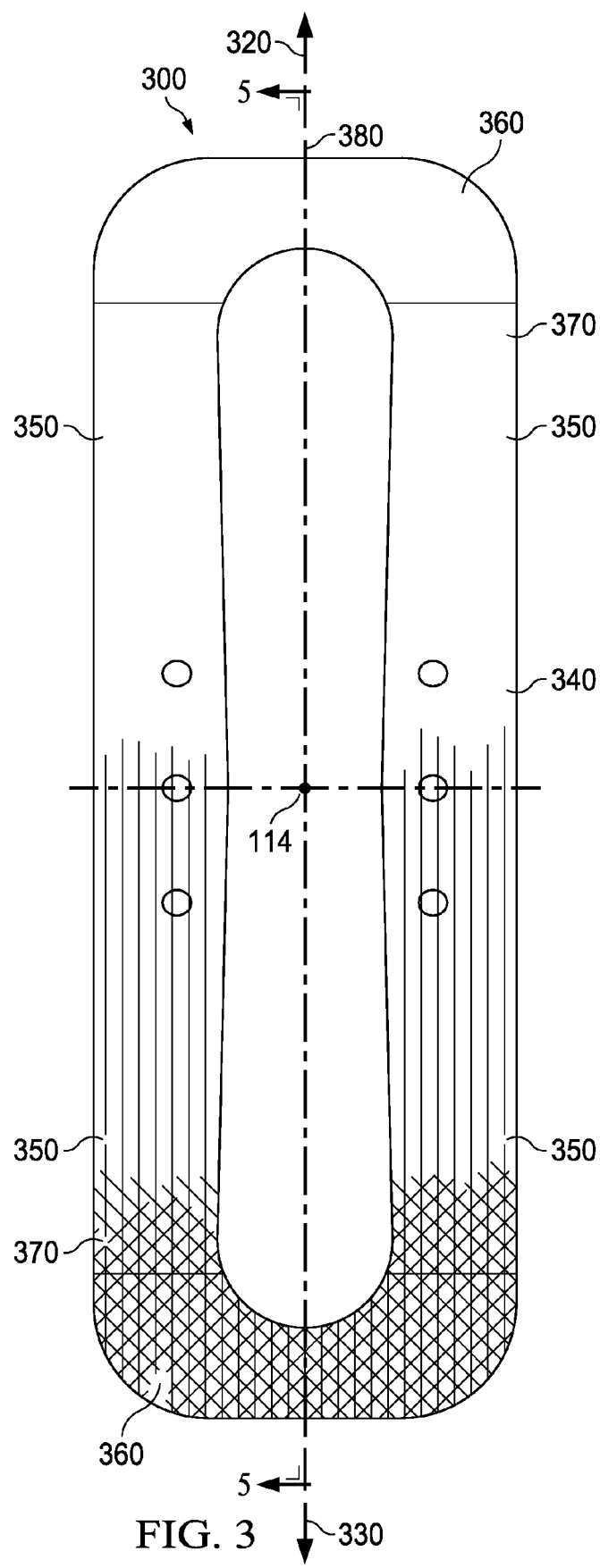
FIG. 3 illustrates a top plan view of a rotor yoke according to an embodiment of the disclosure.
Figure 4:
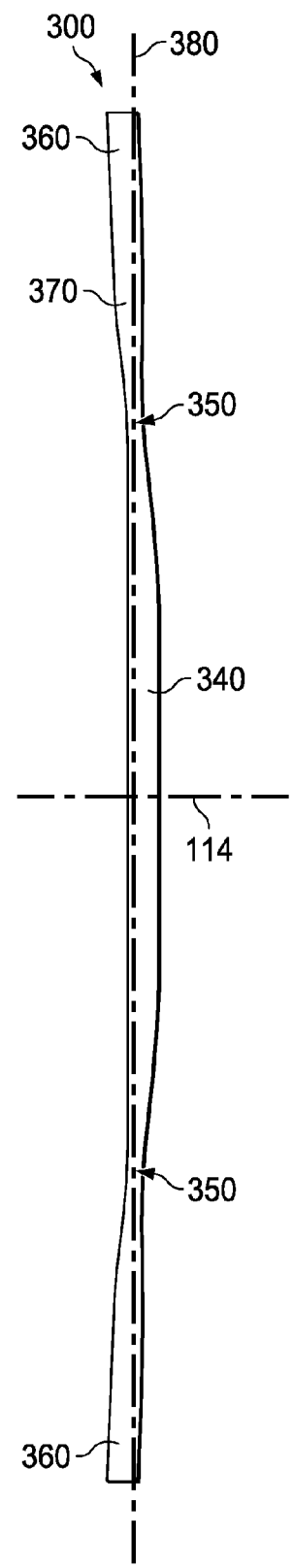
FIG. 4 illustrates a side elevation view of a rotor yoke according to an embodiment of the disclosure.

An embodiment of one such flexible yoke 210 as described herein is illustrated by FIGS. 3 and 4. FIG. 3 depicts a top, plan view of rotor yoke 300, whereas FIG. 4 depicts a side elevation view of rotor yoke 300, wherein the yoke comprises a 100% pre-impregnated with resin composite material. Rotor yoke 300 provides a means of interconnecting a mast 206 centered at the axis of rotation 114 to a pair of blades 112 extending in the direction of arrows 320 and 330 of a helicopter 100. As illustrated in this embodiment, rotor yoke 300 is generally configured as an elongated loop or rectangle (also referred to as a racetrack shape), although other shapes (e.g. an ellipse, an oval, a rectangle, etc.) are possible. Rotor yoke 300 may comprise a pair of spaced apart longitudinal side portions 370 interconnected by a pair of rounded outboard portions 360 that form the elongated loop around the axis of rotation 114. Each longitudinal side portion 370 may comprise a central portion 340 located adjacent to the axis of rotation 114 connected to two flexure portions 350 each located outboard of the central portion 340. Rotor yoke 300 may comprise or consist essentially of layers of composite fiber fabric laid on top of each other. Flexure portions 350 may comprise fewer composite plies than the central portion 340 or the rounded outboard portions 360. Additionally, flexure portions 350 may consist essentially of 0° plies, which may result in a reduced cross-sectional area for the flexure portions 350. Provisions of flexure portions 350 permit the blades 112 of a helicopter 100 to flap in the direction of arrows 320 and 330. The specific degree of cross-sectional area reduction of the flexure portions 350 is entirely dependent on the specific flexural requirements of the main rotor assembly. Rounded outboard portions 360 may require greater stiffness and mechanical strength than other areas of the rotor yoke 300 as they may be coupled to the helicopter blades 112. In an embodiment, this greater stiffness and mechanical strength may be provided by layers of fabric having differing orientations in the rounded outboard portions 360. Whereas the flexure portions 350 may consist essentially of 0° plies, the rounded outboard portions 360 may comprise a plurality of plies in varying orientations (e.g. about 0°, about 15°, about 30°, about 45°, about 60°, about 75°, about 90°, about 105°, about 120°, about 135°, about 150°, and/or about 165° relative to the center axis 380). The rotor yoke in this embodiment comprises about 80% 0° plies, 10% positive 45° plies, and 10% negative 45° plies. However, the ply orientation may be arbitrary as result of the rotation. This cross-hatching may provide greater stiffness and mechanical strength by using the plies with varying orientations. This may be accomplished by the fibers in the plies with varying orientations picking up mechanical loads from the fibers in the 0° plies and transferring them to other areas of the rotor yoke 300.

Figure 5:
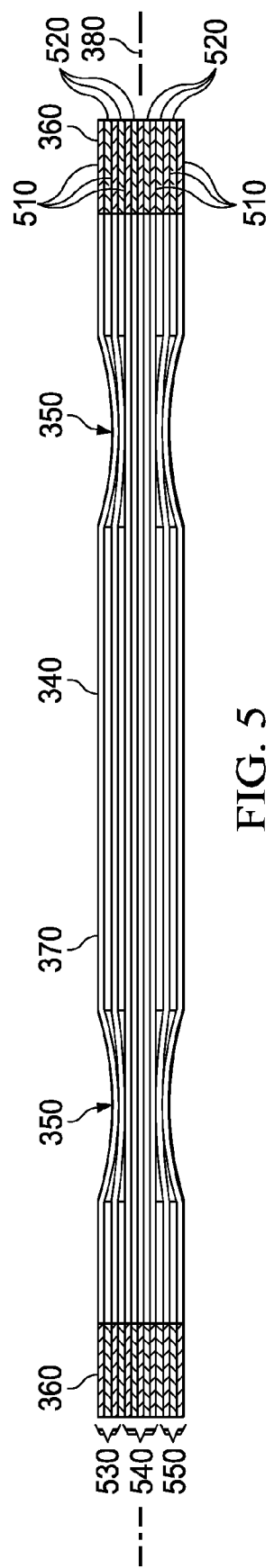
FIG. 5 illustrates a rotor yoke in the shape of an ellipse according to an embodiment of the disclosure.

FIG. 5 is an enlarged, cross-sectional view of the rotor yoke 300 taken along the line 5-5 in FIG. 3 illustrating an embodiment of its internal construction in accordance with this disclosure. Rotor yoke 300 may comprise a plurality of first layers 510 and a plurality of second layers 520. Each first layer 510 may comprise a ply of composite material that is a fabric material (e.g. woven, conventional woven, stitched, knitted, or specialty fabrics), which is neither in the form of a tape nor a filament winding. The substantially parallel, continuous fibers that comprise each first layer 510 may be arranged in a flat, side by side relationship; and therefore, extend along the length of rotor yoke 300 parallel to a center axis 380 that is orthogonal to the axis of rotation 114. Such is shown in the middle section 540. Alternatively, the ply of composite material (e.g. carbon fiber, fiberglass, etc.) may comprise a plurality of 0° fibers and 90° fibers laid in a grid or woven into a fabric form. Also, the ply of composite material may comprise a plurality of fibers in any combination of orientations woven into a fabric form. The ply of unidirectional, composite material may further comprise a plurality of substantially parallel, continuous fibers in a 0° direction that are embedded in a matrix material. The matrix material gives rigidity to the fibers and binds the fibers together. The matrix material also serves to transfer stress loads to the fibers and to spread the loads across them. Those skilled in the art will appreciate that any suitable, commercially accepted fiber material may be used, and that such is generally available in a pre-preg form that has to be cured to become rigid. Similarly, those skilled in the art will appreciate that any suitable, commercially accepted matrix material may be used.

Each second layer 520 may be cut from the same unidirectional, composite material as the plurality of first layers 510. A difference between the first layers 510 and second layers 520 is each of the second layers 520 are rotated prior to overlapping the layers comprising the rotor yoke 300. Because of this rotation, the plurality of substantially parallel, continuous fibers that comprise each second layer 520 will be another direction (e.g. about 15°, about 30°, about 45°, about 60°, about 75°, about 90°, about 105°, about 120°, about 135°, about 150°, and/or about 165° relative to the center axis 380). However, the fiber orientation may be arbitrary as result of the rotation. The second layers 520 may be stacked with the first layers 510 in varying sequences during an assembly of the rotor yoke 300 according to a rotor yoke design. It will be appreciated that various fiber orientations can be stacked in the layers. Such is shown in the top section 530 and the bottom section 550.

In this embodiment, the second layers 520 may serve numerous purposes. One purpose of the second layers 520 within the rotor yoke 300 may be to pick up some of the loads that are applied to the rotor yoke 300 during operation from the first layers 510. Another purpose of the second layers 520 may be to provide the strength required to support a centrifugal force fitting (e.g. a CF bearing) for retention of the centrifugal force. Once the rotor yoke 300 is assembled according to the rotor yoke design, the alternating first and second layers 510 & 520 may then be cured according to standard commercial practices. One embodiment of the rotor yoke 300 proposed in this disclosure may permit the fabric stacking process to be fully automated. This may be permitted using flat plies of composite fabric material that is neither in the form of a narrow steered slit tape nor a filament winding. Also, by not using composite material in narrow steered slit tape or filament winding form, the density of plies per inch of the rotor yoke 300 may be increased from about four plies per inch to about sixteen plies per inch or more.

Figure 6:
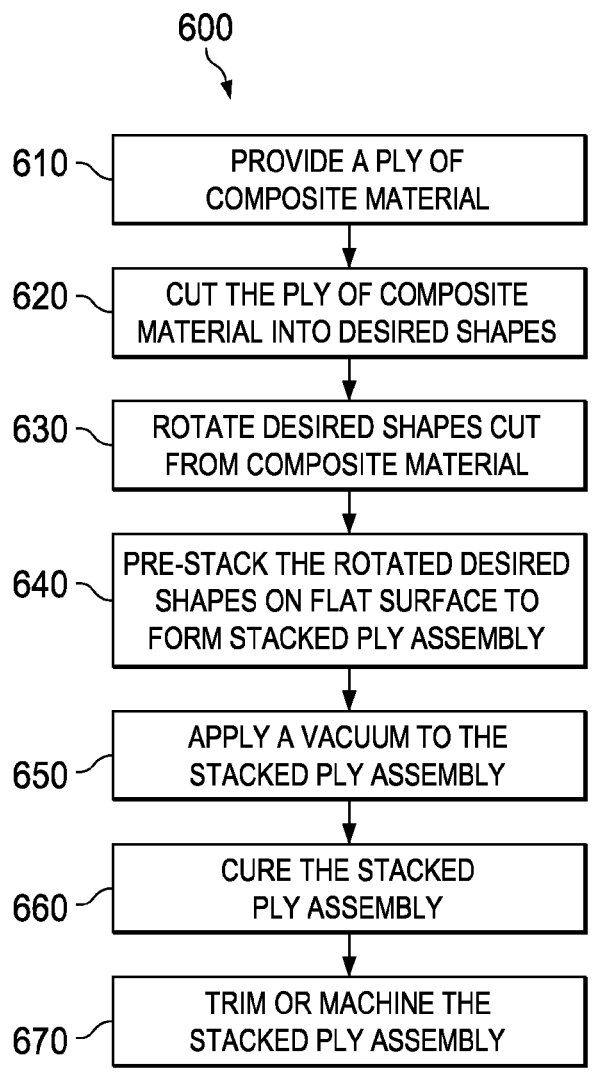
FIG. 6 is a flowchart illustrating a method of constructing a composite material rotor yoke according to an embodiment of the disclosure.

Referring now to FIG. 6, an exemplary method 600 of constructing a composite material rotor yoke is shown. The method 600 comprises, at block 610, providing a ply of composite material, which is neither in the form of a tape nor a filament winding. At block 620, the ply of composite material is cut into a plurality of desired shapes according to the design of the particular composite rotor yoke that is being constructed. At block 630, a portion of the desired shapes are rotated in a certain direction according to the composite material rotor yoke design with respect to the original orientation of the ply of composite material (e.g. about 15°, about 30°, about 45°, about 60°, about 75°, about 90°, about 105°, about 120°, about 135°, about 150°, and/or about 165°) and placed as appropriate (e.g. using laser projections on a table) to create a plurality of second layers. The remaining desired shapes that are left in the original orientation create a plurality of first layers. Then, at block 640, the method 600 comprises pre-stacking the plurality of desired shapes cut from the ply of composite material on a flat surface to form a stacked ply assembly. The first and second layers of composite material may be stacked in alternating sequences according to the composite material rotor yoke design. The stacking of first and second layers may create a rough outline of the shape of the finished part. Between each stacked layer of composite material, a thin coat of resin material may be applied. Also, after each layer of composite material is added to the stacked ply assembly, the stacked ply assembly may be rolled to remove air and debulk the impregnated layers of composite material with the adhesive and resin material. The rolling may also remove any trapped air from the stacked ply assembly. The material can be bagged and debulked using a vacuum pump or pressure bladder. The first layers of composite material contribute the majority of fibers in the flexure regions of the composite material rotor yoke. The first layers of composite material may also provide continuous fibers that run the full length of the finished part. As discussed above, the second layers of composite material may be stacked in areas of the stacked ply assembly to pick up some of the loads that are applied to the composite material rotor yoke during operation. This "interlacing" arrangement may provide the finished part with a greater strength overall. Also, the second layers of composite material may be stacked in areas of the stacked ply assembly to provide the strength required to support a centrifugal force fitting for retention of the centrifugal force. At block 650, the method 600 comprises applying a vacuum to the stacked ply assembly. During this stage, atmospheric pressure may be used to suck air from under a vacuum bag to compact the stacked ply assembly against the flat surface. This stage may be used to make the finished part denser by removing any residual air within the stacked ply assembly. Then, at block 660, the method 600 comprises curing the stacked ply assembly by heating the stacked ply assembly. The specific time, temperature, and pressure parameters for the curing process may be dictated by the rotor yoke design parameters. This heating action may trigger a reaction in the resin material that transforms it from a liquid state to a solid state (cure). As a result the stacked ply assembly may be transformed into a hardened, unitary finished part. At block 670, the method 600 may optionally comprise trimming or machining the finished part to bring it into specific tolerances.

Figure 7:
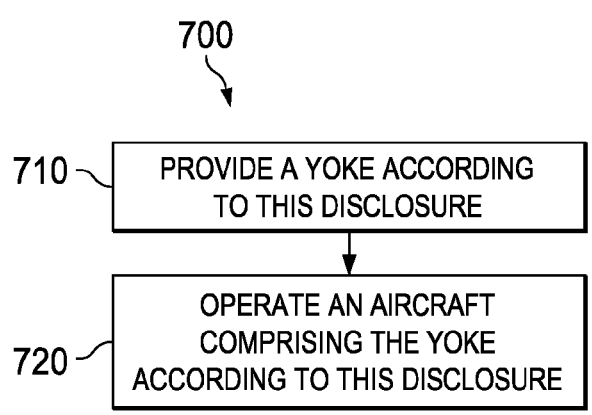
FIG. 7 is a flowchart illustrating a method of using a composite material rotor yoke according to an embodiment of the disclosure.

FIG. 7 illustrates an exemplary method of using a composite material rotor yoke according to this disclosure. The method 700 optionally comprises, at block 710, providing a composite material rotor yoke according to this disclosure. In some embodiments, "providing" may be designing, manufacturing, or assembling the composite rotor yoke according to this disclosure. Then, at block 720, the method 700 comprises operating an aircraft comprising the composite material rotor yoke according to this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a racetrack style rotor yoke having two longitudinal side portions connected together via two rounded outboard portions, the racetrack style rotor yoke comprising:
        a plurality of first layers extending along the longitudinal side portions and the rounded outboard portions, the plurality of first layers formed of a first unidirectional composite fabric material having a plurality of first fibers oriented in a first direction, wherein the plurality of first fibers of the first layers are oriented in the first direction and only in the first direction throughout the longitudinal side portions and the rounded outboard portions; and
        a plurality of second layers stacked with the first layers at the rounded outboard portions, the plurality of second layers formed of a second unidirectional composite fabric material having a plurality of second fibers oriented in a second direction, wherein the second direction is different from the first direction.

2. The apparatus of claim 1, wherein the first direction is about 0° and is oriented parallel with the length of the longitudinal side portions, and wherein the second direction is about 45°, about 90°, or about 135° with respect to the first direction.

3. The apparatus of claim 2, wherein the first fibers and the second fibers are selected from the group consisting of carbon, glass, aramid, and polyethylene, and wherein the first composite fiber material and the second composite fiber material further comprise a resin selected from the group consisting of epoxy, phenolic, bismaleimide, and cyanates.

4. The apparatus of claim 1, wherein flexure portions of the longitudinal side portions consist essentially of the first unidirectional composite fabric material.

5. The apparatus of claim 1, wherein the racetrack style rotor yoke comprises at least sixteen plies of composite fabric material per inch, the composite fabric material comprising the first composite fabric material and the second composite fabric material.

6. The apparatus of claim 1, wherein the outboard portions further comprise:
    a first section consisting essentially of the first unidirectional composite fabric material;
    a second section positioned above the first section and comprising alternating layers of the first unidirectional composite fabric material and the second unidirectional composite fabric material; and a third section positioned below the first section and comprising alternating layers of the first unidirectional composite fabric material and the second unidirectional composite fabric material.

7. The apparatus of claim 6, wherein the first unidirectional composite fabric material in the first, second, and third sections extend into the longitudinal side portions.

8. The apparatus of claim 7, wherein the second unidirectional composite fabric material in the second and third sections does not extend into the longitudinal side portions.

9. The apparatus of claim 1, wherein the racetrack style rotor yoke does not comprise composite fabric material in the form of steered slit tape or filament windings.

10. The apparatus of claim 1, further comprising:
a plurality of rotor blades coupled to the racetrack style rotor yoke;
a fuselage; and
an engine coupled to the fuselage and to the yoke via a mast.

11. The apparatus of claim 1, wherein the longitudinal side portions are spaced apart and substantially parallel with each other, and wherein the two rounded outboard portions interconnect the longitudinal side portions.

12. An apparatus comprising:
a racetrack style rotor yoke having two longitudinal side portions connected together via two rounded outboard portions, wherein the outboard portions comprise:
a plurality of first layers formed of a first unidirectional composite fabric material comprising a plurality of first fibers oriented in a first direction, the plurality of first layers extending into the longitudinal side portions, wherein the plurality of first fibers consist essentially of fibers that are oriented in the first direction and only in the first direction throughout the longitudinal side portions and the rounded outboard portions; and
a plurality of second layers stacked with the plurality of first layers and formed of a second unidirectional composite fabric material, the second unidirectional composite fabric material comprising a plurality of second fibers oriented in a second direction different from the first direction;
wherein the racetrack style rotor yoke does not comprise composite fabric material in the form of slit tape or filament windings.

13. The apparatus of claim 12, wherein the first direction is about 0° and is oriented parallel with the length of the longitudinal side portions, and wherein the second direction is about 45°, about 90°, or about 135° with respect to the first direction.

14. The apparatus of claim 12, wherein the outboard portions further comprise:
a first section consisting essentially of the first unidirectional composite fabric material;
a second section positioned above the first section and comprising alternating layers of the first unidirectional composite fabric material and the second unidirectional composite fabric material; and
a third section positioned below the first section and comprising alternating layers of the first unidirectional composite fabric material and the second unidirectional composite fabric material.

15. The apparatus of claim 14, wherein the first unidirectional composite fabric material in the first, second, and third sections extend into the longitudinal side portions.

16. The apparatus of claim 15, wherein the second unidirectional composite fabric material in the second and third sections does not extend into the longitudinal side portions.

* * * * *